(12) United States Patent
Fujioka et al.

(10) Patent No.: US 8,419,403 B2
(45) Date of Patent: Apr. 16, 2013

(54) CONVEYER OF HONEYCOMB FORMED ARTICLE AND CONVEYING METHOD THEREOF

(75) Inventors: Yasumasa Fujioka, Nagoya (JP); Yohei Takemori, Nagoya (JP); Yuji Ueda, Nagoya (JP); Kiyoshi Ishihara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 497 days.

(21) Appl. No.: 12/724,672

(22) Filed: Mar. 16, 2010

(65) Prior Publication Data

US 2010/0237123 A1    Sep. 23, 2010

(30) Foreign Application Priority Data

Mar. 18, 2009   (JP) ................................. 2009-065819

(51) Int. Cl.
   *B65G 49/00* (2006.01)
(52) U.S. Cl.
   USPC .......................................... 425/113; 425/114
(58) Field of Classification Search ............. 264/177.17, 264/177.12; 425/114, 403.1, 113; 226/7, 226/97.1
   See application file for complete search history.

(56) References Cited

U.S. PATENT DOCUMENTS

| 5,205,991 A | 4/1993 | Avery et al. |
| 2004/0076705 A1 | 4/2004 | Ishikawa et al. |
| 2006/0012073 A1* | 1/2006 | Miura et al. ............. 264/177.12 |
| 2007/0194480 A1 | 8/2007 | Ishikawa et al. |

FOREIGN PATENT DOCUMENTS

| JP | 02-131903 | * | 5/1990 |
| JP | 02-171208 | * | 7/1990 |
| JP | 3321825 B2 | | 9/2002 |
| JP | 2004-142160 A1 | | 5/2004 |

* cited by examiner

*Primary Examiner* — Joseph Del Sole
*Assistant Examiner* — Kimberly A Stewart
(74) *Attorney, Agent, or Firm* — Burr & Brown (57) ABSTRACT

There is disclosed a conveyer and a conveying method that enable conveying a lengthy honeycomb formed article extruded at a high speed with a simple apparatus without causing cracks and deformation. The conveyer of a honeycomb formed article includes a plurality of lengthy cradles that are sequentially supplied and then sequentially support and convey the honeycomb formed article, and a fixed support that is fixed so as to extend from the extruder to a supply position of the lengthy cradles, supports the honeycomb formed article just after being extruded, and conveys it to one of the lengthy cradles, and the fixed support is an air float having a supporting face and a plurality of air ejection pores formed on the supporting face that conveys the honeycomb formed article by feeding air from the air ejection pores.

11 Claims, 5 Drawing Sheets

CONVEYER OF HONEYCOMB FORMED ARTICLE AND CONVEYING METHOD THEREOF

BACKGROUND OF THE INVENTION

1. Field of the Invention

The present invention relates to a conveyer of a honeycomb formed article made by extrusion and a conveying method thereof. More specifically, the present invention relates to a conveyer and a conveying method that enable conveying a lengthy honeycomb formed article extruded at a high speed without causing cracks and deformation with a simple apparatus.

2. Description of Related Art

A horizontally extruding method has heretofore been known as a method of forming a honeycomb formed article. In this method, a cylindrical honeycomb formed article is formed by: attaching a mold of a desired shape to the exit of an extruder whose extruding direction is set to be the horizontal direction; and continuously extruding the ceramic material charged to the extruder from the mold. Then a honeycomb mother article is produced by cutting the cylindrical honeycomb formed article to be extruded to a prescribed length. Successively the honeycomb mother article is variously processed by drying, sintering, and others and finally a single honeycomb formed article or a plurality of honeycomb formed articles is obtained as a final formed article from one honeycomb mother article.

Here, a cylindrical honeycomb formed article just after being extruded is very soft and weak and deformable. It is necessary to support the cylindrical honeycomb formed article just after extrusion so as not to deform it and to convey it to each step in order to obtain a final formed article of good quality.

As a conveyer to convey an extruded cylindrical honeycomb formed article, as described in Patent Document 1 for example, a cradle type conveyer having a cradle of a prescribed length is mounted on a conveyer and supplied sequentially toward the downstream of the exit of an extruder and an extruded honeycomb formed article is sequentially supported and conveyed on the supplied cradle is known. According to the conveyer described in Patent Document 1, the length of a cradle in the conveying direction is set so that a honeycomb mother article cut out from the extruded honeycomb formed article may be supported and conveyed by a plurality of cradles each having a length in the conveying direction less than half the length of the honeycomb mother article in the axial direction and thus it has been possible to support and convey a honeycomb formed article lengthier than ever before. That is, since the length of one cradle in the conveying direction is short, the distance between the extruder and the supply position of cradles shortens in proportion and it has been possible to mount a honeycomb formed article on the supplied cradles before it hangs down under its own weight even though the honeycomb formed article being extruded is lengthy.

Further as another conveyer, as described in Patent Document 2 for example, an air float type conveyer to convey a honeycomb formed article while sliding on the supporting face of a rail by: installing a fixed rail having a concave shape in cross section conforming to the cross sectional shape of the honeycomb formed article in the manner of being connected to the exit of an extruder; ejecting air from a plurality of open frontal areas formed on the supporting face of the rail on which the honeycomb formed article is mounted; and reducing the contact resistance between the supporting face and the honeycomb formed article is known. The conveyer of Patent Document 2 is equipped with a humidifier to control the humidity of the ejected air by mixing steam with the air in order to prevent the honeycomb formed article from desiccating due to air ejection.

[Patent Document 1] JP-A-2004-142160
[Patent Document 2] JP-B2-3321825

SUMMARY OF THE INVENTION

Such a conventional conveying method as stated above however has the following problems. In the conveyer described in Patent Document 1 for example, it has been possible to convey a honeycomb formed article longer than ever before in the axial direction by adjusting the length of a cradle in the conveying direction in relation to the length of a cut-out honeycomb mother article in the axial direction but it has been impossible to convey a lengthy honeycomb formed article having a length longer than a certain length in the axial direction while preventing the honeycomb formed article just after being extruded from hanging down under its own weight. Further, since the supply speed of a cradle is limited to some extent, ceramics can be extruded only at a speed synchronizing with the supply speed of the cradles in order to prevent the honeycomb formed article from hanging down under its own weight and the conveyer cannot cope with high-speed honeycomb forming aimed at reducing costs.

Meanwhile in the conveyer of Patent Document 2, although damage such as cracks and breakage caused by the desiccation of a conveyed honeycomb formed article is prevented from occurring by controlling the humidity of ejected air in a prescribed range, there has been the problem of cost because large-scale equipment is required since a humidifying means, together with a rail, has to be installed along the whole pathway for conveying a honeycomb formed article to a conveyer in a dryer and also the air is required to keep a high humidity. Further, since a honeycomb formed article is hardly cut out on a fixed rail, it has been necessary to use a complicated mechanism such as a movable float in a cutting step.

The present invention has been made in view of the above problems and an object of the present invention is to provide a conveyer and a conveying method that enable conveying a lengthy honeycomb formed article extruded at a high speed with a simple apparatus without causing cracks and deformation.

The present inventors, as a result of conducting intensive studies in view of the above problems, have found that a lengthy honeycomb formed article extruded at a high speed can be conveyed without causing cracks and deformation by: adopting a conveyer having a lengthy cradle excellent in cost performance and easiness of formed article cutting; and simultaneously installing an air float to support the lengthy honeycomb formed article from an extruder to the lengthy cradle so that the lengthy honeycomb formed article may not hang down. Here, a lengthy cradle represents a conveying cradle having a length comparable with or longer than the length of a lengthy honeycomb formed article that hangs down under its own weight if not supported. By the present invention, it is possible to provide the following conveyer of a honeycomb formed article and conveying method thereof.

[1] A conveyer of a honeycomb formed article for guiding a lengthy honeycomb formed article extruded continuously from an extruder to cutting and drying steps, the conveyer comprising: a plurality of lengthy cradles that are sequentially supplied, at a downstream position of the extruder in an extruding direction, in synchronization with the extruding speed of the honeycomb formed article, and sequentially support and convey downstream the extruded honeycomb formed article on a mounting face formed so as to conform to a cross-sectional shape of a section perpendicular to an axial direction of the honeycomb formed article, and a fixed support that is fixed so as to extend from below the exit of the extruder to a supply position of the lengthy cradles, supports the honeycomb formed article just after being extruded, and conveys the honeycomb formed article to one of the lengthy cradles; wherein the fixed support is an air float having a supporting face formed so as to conform to the cross-sectional shape of the section perpendicular to the axial direction of the honeycomb formed article to be supported and a plurality of air ejection pores formed on the supporting face, that slides and conveys the honeycomb formed article from the extruder to one of the lengthy cradles by feeding air from the air ejection pores to between the supporting face and the honeycomb formed article.

[2] The conveyer of a honeycomb formed article according to Item [1], wherein the air float is disposed to be downwardly-inclined from below the exit of the extruder toward the supply position of the lengthy cradles.

[3] The conveyer of a honeycomb formed article according to Item [1] or [2], wherein the drop distance when the honeycomb formed article is transferred from the air float to one of the lengthy cradles is in the range of 5 to 70 mm.

[4] The conveyer of a honeycomb formed article according to any one of Items [1] to [3], wherein the thickness of the bottom of the air float is in the range of 5 to 40 mm.

[5] The conveyer of a honeycomb formed article according to any one of Items [1] to [4], having a humidity controller to control the relative humidity of the air ejected from the plurality of air ejection pores in the range of 30 to 80%.

[6] The conveyer of a honeycomb formed article according to anyone of Items [1] to [5], wherein the length of the air float is in the range of 400 to 1,000 mm.

[7] The conveyer of a honeycomb formed article according to any one of Items [1] to [6], having a temperature controller to control the temperature of the air ejected from the plurality of air ejection pores to a temperature lower than that of the honeycomb formed article.

[8] A conveying method of a honeycomb formed article for guiding a lengthy honeycomb formed article extruded continuously from an extruder to cutting and drying steps, the method comprising: an air float conveying step of supporting the honeycomb formed article just after being extruded with an air float as a fixed support having a plurality of air ejection pores formed on a supporting face, sliding and conveying the honeycomb formed article by air flowing from the air ejection pores to between the supporting face and the honeycomb formed article; and a lengthy cradle conveying step of transferring the honeycomb formed article from the air float to a lengthy cradle supplied adjacently to an end of the air float in the conveying direction and conveying the honeycomb formed article integrally with the lengthy cradle in the state where the honeycomb formed article is supported on a mounting face of the lengthy cradle.

[9] The conveying method of a honeycomb formed article according to Item [8], wherein, in the air float conveying step, the honeycomb formed article is slid and conveyed by the functions of the air and its own weight with the air float disposed to be downwardly-inclined from below the exit of the extruder toward the supply position of the lengthy cradle.

[10] The conveying method of a honeycomb formed article according to Item [8] or [9], wherein, in the air float conveying step, the relative humidity of the air ejected from the air ejection pores is controlled in the range of 30 to 80% and the temperature of the air is controlled to a temperature lower than that of the honeycomb formed article.

A conveyer of a honeycomb formed article and a conveying method thereof according to the present invention enable: conveying a lengthy honeycomb formed article extruded at a high speed without causing cracks and deformation; and minimizing the equipment size and cost.

DETAILED DESCRIPTION OF THE INVENTION

Embodiments according to the present invention will be described below with reference to drawings. The present invention is not limited to the following embodiments and can be changed, modified, and improved within the range not deviating from the scope of the present invention.

Figure 1:
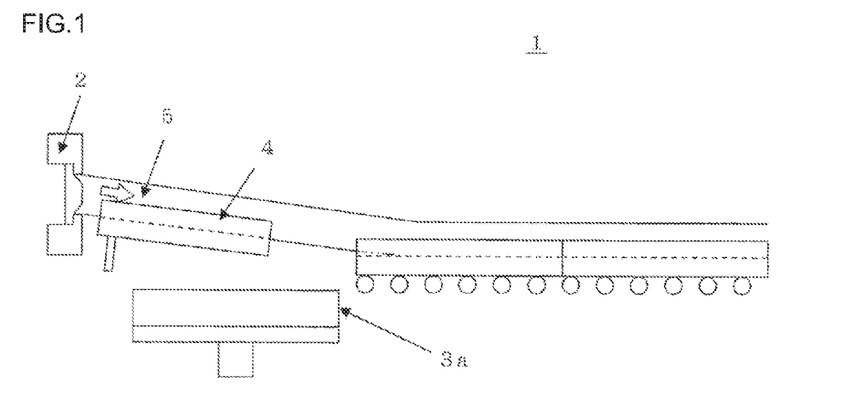
FIG. 1 is a schematic view showing a layout in an embodiment of a conveyer of a honeycomb formed article according to the present invention.
Figure 3:
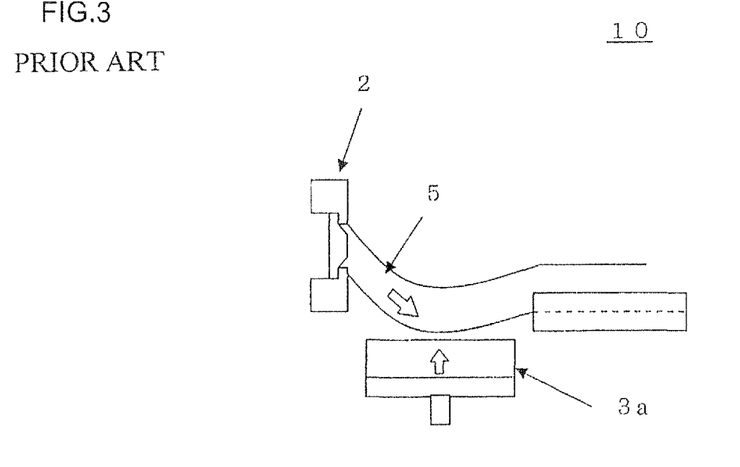
FIG. 3 is a schematic view showing the state where an extruded honeycomb formed article is supported by lengthy cradles in another embodiment of a conventional cradle conveyer of a honeycomb formed article.
Figure 4:
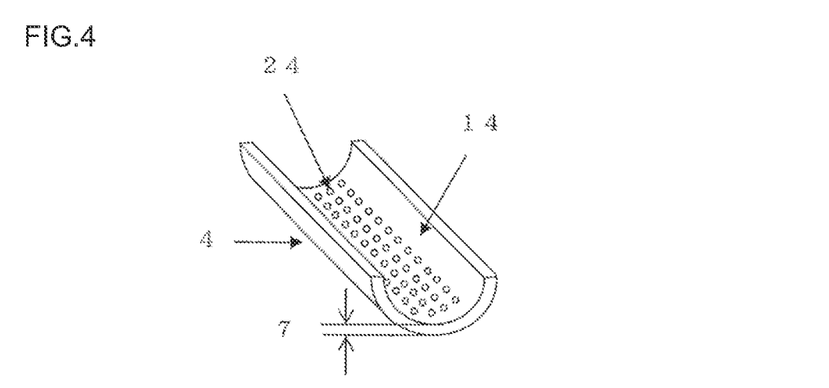
FIG. 4 is a schematic perspective view showing an embodiment of an air float used in a conveyer of a honeycomb formed article according to the present invention.

FIG. 1 is a schematic view showing a layout in an embodiment of a conveyer of a honeycomb formed article according to the present invention and FIG. 4 is a schematic perspective view showing an embodiment of an air float used in a conveyer of a honeycomb formed article according to the present invention. A conveyer 1 of a honeycomb formed article according to the present invention is a conveyer to guide a lengthy honeycomb formed article 5 extruded continuously from an extruder 2 to cutting and drying steps and, as shown in FIG. 1, has, at a position downstream from the extruder 2 in the extruding direction, a plurality of lengthy cradles 3a that are supplied sequentially in synchronization with the extruding speed of the honeycomb formed article 5 and supports sequentially and conveys downstream the extruded honeycomb formed article 5 on a mounting face formed so as to conform to the shape of the honeycomb formed article 5 in a cross section perpendicular to the axial direction of the honeycomb formed article 5, and a fixed support that is fixed so as to extend from below the exit of the extruder 2 to the supply position of the lengthy cradles 3a, supports the honeycomb formed article 5 just after extruded, and conveys the honeycomb formed article 5 to one of the lengthy cradles 3a. Here, the fixed support is an air float having a supporting face 14 formed so as to conform to the shape of the honeycomb formed article 5 in a cross section perpendicular to the axial direction of the honeycomb formed article 5 to be supported and a plurality of air ejection pores 24 formed on the supporting face 14, that slides and conveys the honeycomb formed article 5 from the extruder 2 to one of the lengthy cradles 3a by feeding air from the air ejection pores 24 to between the supporting face 14 and the honeycomb formed article 5. Further, FIG. 2 is a schematic view showing the state where an extruded honeycomb formed article is supported by a cradle in an embodiment of a conventional cradle conveyer of a honeycomb formed article and FIG. 3 is a schematic view showing the state where an extruded honeycomb formed article is supported by a cradle in another embodiment of a conventional cradle conveyer of a honeycomb formed article.

Figure 2:
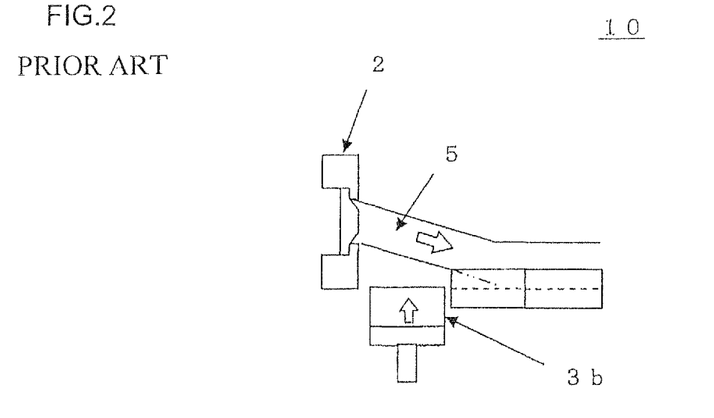
FIG. 2 is a schematic view showing the state where an extruded honeycomb formed article is supported by cradles in an embodiment of a conventional cradle conveyer of a honeycomb formed article.

In a conventional cradle conveyer 10, since a honeycomb formed article 5 extruded from an extruder 2 is directly mounted on a cradle 3 supplied at a downstream position of the extruding direction and conveyed, when cradles 3b having the short length in the conveying direction are used as shown in FIG. 2 for example, it is possible to smoothly support and convey the honeycomb formed article 5 with the cradles 3b supplied sequentially but, when lengthy cradles 3a having the long length in the conveying direction are used as shown in FIG. 3 for example, the distance between the extruder 2 and the supply position of cradles 3a is long, hence the honeycomb formed article 5 hangs down under its own weight before it arrives at the lengthy cradles 3a, and it has been difficult to mount the honeycomb formed article 5 on the lengthy cradles 3a without causing deformation. A conveyer 1 of a honeycomb formed article according to the present invention has enabled conveying even a lengthy honeycomb formed article 5 on the lengthy cradles 3a without damaging the shape by installing an air float 4 as a fixed support so as to connect the exit of an extruder 2 to the supply position of lengthy cradles 3a in order to prevent such hanging down of the honeycomb formed article 5. As a result, the forming speed of a honeycomb formed article 5 has increased, the rejection rate has decreased, and the cost has been reduced.

An air float 4 used in the present invention, as shown in FIG. 4, has a supporting face 14 formed so as to conform to the shape of a supported honeycomb formed article 5 in a cross section perpendicular to the axial direction of the honeycomb formed article 5 and a plurality of air ejection pores 24 are formed on the supporting face 14. Air ejected from the air ejection pores 24 functions as an air bearing between the honeycomb formed article 5 mounted on the supporting face 14 and the supporting face 14 and can transfer the honeycomb formed article 5 to a cradle 3 without damaging the shape.

A material for the air float 4 is not particularly limited as long as the material can be formed into such a hollow structure as shown above, is not affected by humidity, pressure, and the like, and has a sufficient durability. Then it is preferable to use stainless steel, aluminum, resin, and the like. Further it is particularly preferable to use stainless steel from the viewpoint of wear resistance.

In a conveyer 1 of a honeycomb formed article according to the present invention, it is preferable that an air float 4 is installed to be downwardly-inclined from below the exit of an extruder 2 toward the supply position of lengthy cradles 3a as shown in FIG. 1. By forming such a slope to the air float 4, it is possible to smoothly convey the honeycomb formed article 5 to one of the lengthy cradles 3a by the interaction of the air bearing function caused by air ejection and the self weight of the honeycomb formed article 5 without giving a specific force to the conveyed honeycomb formed article 5. The angle of the slope of the air float 4 is not particularly limited as long as the honeycomb formed article 5 can be smoothly conveyed from the extruder 2 to one of the lengthy cradles 3a but it is preferable to adjust the slope angle so that the honeycomb formed article 5 may be conveyed at a speed nearly identical to the forming speed. For example, it is preferable that the angle formed between the extrusion direction of the honeycomb formed article (horizontally conveying direction) and the direction of the slope of the air float 4 is adjusted in the range of 1 to 9 degrees. If the angle is smaller than one degree, the deformation of the honeycomb formed article 5 increases after it leaves from the air float 4 and the lower part of the honeycomb formed article 5 crushes in accordance with the deformation. If the angle exceeds nine degrees, the force acting on the honeycomb formed article 5 in the vertical direction increases and hence the lower part of the honeycomb formed article 5 crushes when one of the lengthy cradles 3a receives the honeycomb formed article 5.

In a conveyer 1 of a honeycomb formed article according to the present invention, it is preferable that the drop distance when the honeycomb formed article 5 is transferred from the air float 4 to one of the lengthy cradles 3a is in the range of 5 to 70 mm. The drop distance is yet preferably in the range of 20 to 50 mm. If the drop distance is less than 5 mm, the lengthy cradles 3a are hardly supplied and, if it exceeds 70 mm, the shape of the honeycomb formed article 5 may be damaged occasionally when being transferred.

Figure 5A:
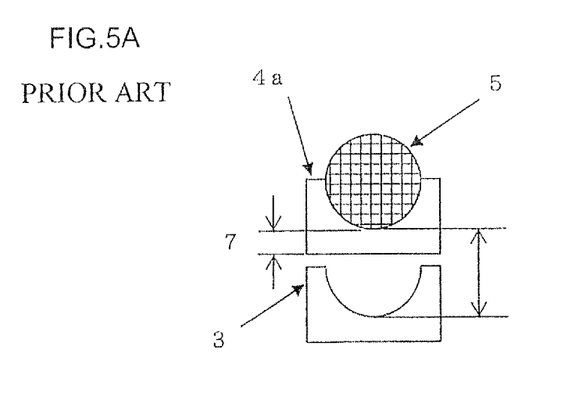
FIG. 5A is a schematic sectional view showing the state where a honeycomb formed article is supported by an air float used in a conventional conveyer of a honeycomb formed article.

For example, FIG. 5A is a schematic sectional view showing the state where a honeycomb formed article is supported by an air float used in a conventional conveyer of a honeycomb formed article and, since the air float thickness 7 that is the thickness of the bottom is large in the case of a conventional air float 4a shown in FIG. 5A, the difference in level from a cradle 3 exists inevitably, and the drop distance of the honeycomb formed article 5 to the cradle 3 increases, thereby causing defects such as the distortion of cells, the deformation of an outer peripheral wall, and the like. In a conventional air float type conveyer, an air float 4 functions as a conveying path for conveying a honeycomb formed article 5 extruded from an extruder to each step and hence the air float has naturally to take a shape that is long in the conveying direction. The circumstances are that, consequently in order to prevent the air ejection pores 24 from clogging due to dew condensing on the supported honeycomb formed article 5 and circulate the air sufficiently, it has been necessary to increase the thickness of the bottom of the air float 4 and secure a sufficient space in the interior of the air float 4.

Figure 5B:
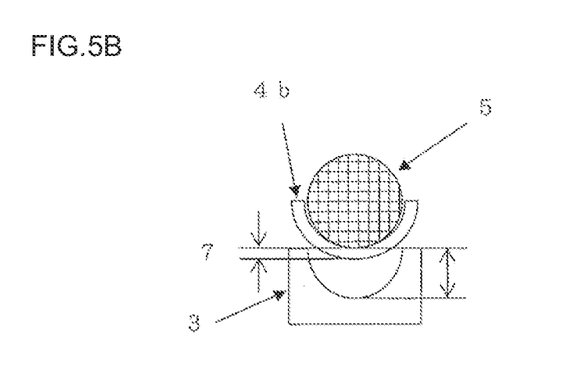
FIG. 5B is a schematic sectional view showing the state where a honeycomb formed article is supported by a low-profile air float used in a conveyer of a honeycomb formed article according to the present invention.

In contrast, FIG. 5B is a schematic sectional view showing the state where a honeycomb formed article is supported by a low-profile air float used in a conveyer of a honeycomb formed article according to the present invention. In the present invention, the drop distance of the honeycomb formed article 5 is minimized when it is transferred to a cradle 3 and the damage of the honeycomb formed article 5 is prevented from occurring by adopting a low-profile air float 4b having a thin bottom in place of a conventional air float 4a of a heavy thickness. It is desirable to reduce the air float thickness 7 that is the thickness of the bottom of the low-profile air float 4b in order to realize such a drop distance as stated above but, if it is too thin, the flow of the air ejected from the air ejection pores 24 is unbalanced, pressure loss increases, and hence the drop distance is preferably in the range of 5 to 40 mm, and yet preferably in the range of 10 to 30 mm. In the present invention, the air float 4 functions as a support to support the honeycomb formed article 5 from the extruder 2 to the lengthy cradle 3a so as not to hang down and the length in the conveying direction is appropriately decided in accordance with the length of the lengthy cradle 3a in the conveying direction and does not exceed a certain value as shown below. Consequently, such a problem as the lowering of air supply caused by the clogging of air ejection pores 24 caused by condensation that has been seen in a conventional air float 4a is not seen. In a conventional air float 4a, it has been necessary to increase the thickness of the bottom and secure the supply of air in order to solve the above problem but, in the present invention, clogging caused by condensation is not concerned, the diameter of the air ejection pores 24 can be reduced, and hence it has been possible to increase the pressure loss at the front and rear of the air ejection pores 24, reduce the capacity of an air reservoir necessary for uniform air ejection, and adopt a low-profile air float 4b having a thin bottom. Here the thickness of the bottom of an air float 4 represents the thickness of the lowest bottom end at the end (an end on the side where the honeycomb formed article 5 is transferred to the cradle 3) of the downstream side of the air float 4 as shown as an air float thickness 7 in FIGS. 4, 5A and 5B.

In an air float type conveyer, the desiccation of a honeycomb formed article 5 caused by the ejection of air is a problem in many cases. That is, problems of a honeycomb formed article 5 just after extruded that contains moisture abundantly are that, by the influence of air ejected from air ejection pores 24, the desiccation of only the bottom portion (the portion facing the supporting face 14 of an air float 4) of the honeycomb formed article 5 advances rapidly, cracks occurs at the bottom portion, and breakage appears at the upper face portion (the portion not facing the supporting face 14 of the air float 4) due to the stress difference caused by the difference of desiccation from the upper face portion. It is preferable that a conveyer 1 of a honeycomb formed article according to the present invention has a humidity controller to control the relative humidity of air ejected from a plurality of air ejection pores 24 in the range of 30 to 80%. If the relative humidity is lower than 30%, cracks and breakage caused by the desiccation cannot sufficiently be prevented from occurring and, if the relative humidity exceeds 80%, dew tends to condensate on the honeycomb formed article 5, smooth conveyance is hindered, and equipment cost for maintaining a high humidity increases. In a conveyer of a honeycomb formed article according to the present invention, since the honeycomb formed article 5 is only temporarily supported on the air float 4, the time required for air ejection is minimized and the quantity of moisture humidified in air can be reduced to a level lower than ever. Accordingly it is possible to simplify the equipment and reduce the cost.

The air can be supplied with a blower as an air supply means and the humidity of the air can be controlled with atomizing nozzles as a humidity controller.

In a conveyer 1 of a honeycomb formed article according to the present invention, the length of the air float 4 is not particularly limited as long as the length allows a lengthy honeycomb formed article 5 to be smoothly transferred to a lengthy cradle 3a; and may appropriately be decided in accordance with the length in the conveying direction of the lengthy cradle 3a that can support and convey a honeycomb formed article 5 having a desired length in the axial direction. If the length of the air float 4 is too short, the length is not suitable for the conveyance of a lengthy honeycomb formed article 5 that is the challenge of the present invention and, if the length is too long, time during which air hits the honeycomb formed article 5 increases. Consequently, the length of the air float 4 is preferably in the range of 400 to 1,000 mm. The length of the air float 4 is the distance between the exit of the extruder 2 and the lengthy cradle 3a, namely the distance corresponding to the length of one lengthy cradle 3a, and hence as long as the length of the air float 4 is in the range stipulated above, the time during which the honeycomb formed article 5 touches air is short and the honeycomb formed article 5 does not excessively desiccate even with a relative humidity of 80% or less.

Further, in a conveyer 1 of a honeycomb formed article according to the present invention, it is preferable that the conveyer 1 has a temperature controller to control the temperature of the air ejected from plural air ejection pores 24 to a temperature lower than that of the honeycomb formed article. If the temperature of the air is higher than that of the honeycomb formed article 5, it sometimes happens that dew condensates on the surface of the honeycomb formed article 5 and the smooth conveyance of the honeycomb formed article 5 to the lengthy cradle 3a is hindered.

In a conveying method of a honeycomb formed article according to the present invention, a conveying method of a cradle system that is considered to be most appropriate mainly from the viewpoint of reducing equipment cost is adopted in order to form a lengthy honeycomb at a high speed. By adopting a conventional cradle conveying method, a conventional cutting method can be applied as it is when the honeycomb formed article 5 is cut. Meanwhile, it is most effective to supply a lengthy cradle 3 in order to cope with lengthening and speeding up in honeycomb forming and, for that purpose, an extruded honeycomb formed article 5 has to reach the lengthy cradle 3a without hanging down and, in the conveying method according to the present invention, it has been possible to prevent hanging down caused by self weight by supporting the extruded honeycomb formed article 5 until it is mounted on the lengthy cradle 3a with the air float 4 fixed from below the exit of the extruder 2 to the supply position of the lengthy cradle 3a. That is, a conveying method of a honeycomb formed article according to the present invention includes: an air float conveying step of supporting the honeycomb formed article 5 just after being extruded with an air float 4 as a fixed support having a plurality of ejection pores 24 formed on a supporting face 14 and sliding and conveying the honeycomb formed article by air flowing from the air ejection pores 24 to between the supporting face 14 and the honeycomb formed article 5; and a lengthy cradle conveying step of transferring the honeycomb formed article 5 from the air float 4 to one of the lengthy cradle 3a supplied adjacently to an end of the air float 4 in the conveying direction and conveying the honeycomb formed article integrally with the lengthy cradle 3a in the state where the honeycomb formed article is supported on the mounting face of the lengthy cradle 3a.

Figure 6:
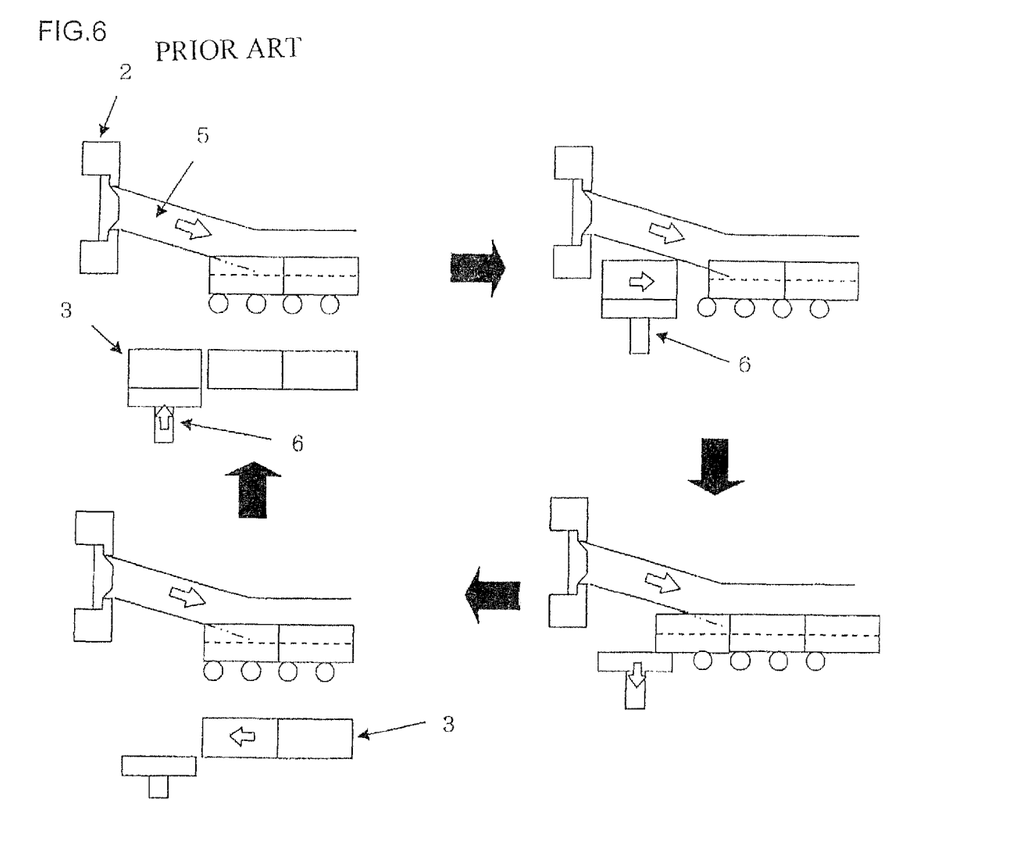
FIG. 6 is a schematic view showing the cycle in which cradles are supplied in an embodiment of a conventional cradle conveyer of a honeycomb formed article shown in FIG. 2.

A method of sending downstream the lengthy cradle 3a on which the honeycomb formed article 5 is mounted is not particularly limited as long as a speed synchronizing with the forming speed of the honeycomb formed article 5 is maintained and an example thereof is a method of using a conveyer comprising rotary rollers and a belt adopted in a conventional cradle conveyer. FIG. 6 is a schematic view showing the cycle in which cradles are supplied in an embodiment of a conventional cradle conveyer of a honeycomb formed article shown in FIG. 2. As shown in FIG. 6, a cradle 3 supplied to the position where the honeycomb formed article 5 is received with an elevator 6 supports the honeycomb formed article 5 and simultaneously moves on the conveyer and transfers the supported honeycomb formed article 5 downstream in the conveying direction. The empty cradle 3 that has finished conveying the honeycomb formed article to the next step is recovered to the elevator 6 by a cradle recovery means and used again for the conveyance of the honeycomb formed article 5 under the same cycle.

In order to smoothly convey the honeycomb formed article 5 to the lengthy cradle 3a without specific force acting on the conveyed honeycomb formed article 5, in the conveying method of a honeycomb formed article according to the present invention, it is preferable to slide and convey the honeycomb formed article by the functions of the air and the self weight with the air float 4 installed to be downwardly-inclined from below the exit of the extruder 2 toward the supply position 3a of the lengthy cradle in the air float conveying step.

Further, in the conveying method of a honeycomb formed article according to the present invention, it is preferable to control the relative humidity of the air ejected from the air ejection pores 24 in the range of 30 to 80% and to control the temperature to a temperature lower than that of the honeycomb formed article 5 in the air float conveying step. Furthermore in particular, it is preferable to control the relative humidity of the air in the range of 50 to 70%. By supplying the air controlled in the ranges of the above conditions, it is possible to prevent damage in a finally formed product and the hindrance of smooth conveyance caused by contact with the air, resultant excessive desiccation of the honeycomb formed article 5, and condensation on the surface of the honeycomb formed article 5.

EXAMPLES

The present invention will be described below further in detail with reference to examples but the present invention is not limited thereto.

Example 1

Ceramic powder and binder powder prepared appropriately so as to form cordierite after sintering were mixed in a dry state and thereafter further mixed by adding water and a surfactant. Thereafter the material was charged in a biaxial-type continuous forming machine with a feeder. The material was kneaded by the rotation of a screw and clay was obtained. Then the clay was extruded into a honeycomb shape by passing through a die attached to the exit of the forming machine. The die was designed so that the cell structure of a honeycomb may have a wall thickness of 4.5 mil (1 mill equals to $1/1,000$ in.), a cell density of 400 cells/in.$^2$, and an outer diameter of 106 mm after sintering. On this occasion, the forming speed at which the honeycomb formed article is extruded from the die was set at 100 mm/s. The honeycomb formed article extruded in this way was sent sequentially to a cradle having a length of 600 mm while being supported by an air float, supported and conveyed by the cradle, and thereafter cut and dried. On this occasion, the thickness and the length of the air float were set at 30 mm and 1,000 mm respectively and the drop distance of the honeycomb formed article from the air float to the cradle was set at 60 mm. A blower was used as the air supply means. An atomizing nozzle was used as a humidity controller and the relative humidity of air was controlled to 50%.

Comparative Example 1

A ceramic honeycomb formed article conveying test was carried out under the same conditions as Example 1 except that the ceramic honeycomb formed article was supported and conveyed directly by a cradle without using an air float.

Example 2, Comparative Examples 2 to 4

Ceramic honeycomb formed article conveying tests were carried out under the same conditions as Example 1 except that the air float thickness, the drop distance, the air relative humidity, and the air float length were set respectively as shown in Table 1.

(Evaluation)

With regard to the cases of Examples 1 and 2 and Comparative examples 1 to 4, in each of the cases, 20 samples were used and the rejection rate and the content of the obtained finally formed articles were confirmed. The results are shown in Table 1. Here, the finally formed article indicates a ceramic honeycomb formed article as the final product after being cut and dried.

TABLE 1

| | Usage of air float | Air float thickness [mm] | Drop distance [mm] | Air humidity [%] | Air float length [mm] | Rejection rate [%] | Content of rejection |
|---|---|---|---|---|---|---|---|
| Comparative example 1 | Not used | — | — | — | — | 100.0 | Deformation of cell or outer wall |
| Example 1 | Used | 30 | 60 | 50 | 1000 | 1.0 | Deformation (minimal) and desiccation cracks (minimal) |
| Example 2 | Used | 10 | 40 | 50 | 400 | 0.0 | |
| Example 3 | Used | 5 | 35 | 60 | 700 | 0.0 | |
| Example 4 | Used | 15 | 45 | 60 | 700 | 0.0 | |
| Example 5 | Used | 40 | 70 | 60 | 700 | 1.0 | Deformation (minimal) |
| Example 6 | Used | 15 | 45 | 30 | 700 | 0.5 | Desiccation cracks (minimal) |
| Example 7 | Used | 15 | 45 | 70 | 700 | 0.0 | |
| Example 8 | Used | 15 | 45 | 80 | 700 | 0.0 | |
| Comparative example 2 | Used | 20 | 50 | 20 | 700 | 25.0 | Desiccation cracks |
| Comparative example 3 | Used | 20 | 50 | 70 | 1500 | 10.0 | Desiccation cracks |
| Comparative example 4 | Used | 50 | 85 | 50 | 1500 | 50.0 | Deformation of cell or outer wall, desiccation cracks |

In Comparative example 1, as seen in the conveyer shown in FIG. 3, the extruded honeycomb formed article hanged down under its own weight before the honeycomb formed article reached the cradle from the extrusion exit, resultantly the honeycomb bottom crushed since the lengthy cradle pushed up the hanging honeycomb when the lengthy cradle was supplied, and thus good finally formed products were not obtained at all. In Comparative example 2, since the relative humidity of the ejected air was low, cracks caused by desiccation was seen at the bottom of the honeycomb formed article. Further in Comparative example 3, since the length of the air float was excessive, the time during which the air hits the honeycomb formed article was long and cracks caused by desiccation was seen at the bottom of the honeycomb formed article in the same way as Comparative example 2 even though the relative humidity was set at a relatively high level. In Comparative example 4, since the thickness of the air float is heavy, the drop distance of the honeycomb formed article was large when the honeycomb formed article was transferred to the lengthy cradle and the distortion of cells and the dents on the outer wall were confirmed in the vicinity of the bottom of the honeycomb formed article. Further, the desiccation cracks attributed to the length of the air float were also confirmed at the bottom.

In Examples 1 to 8 in contrast, since the air humidity and the air float thickness were set in appropriate ranges, the desiccation of the honeycomb formed article caused by air ejection was prevented. Further, since the drop distance of the honeycomb formed article was set in an appropriate range, the deformation of the honeycomb formed article was prevented when the honeycomb formed article was transferred to the lengthy cradle. As a result, rejection of the finally formed articles was scarcely recognized.

INDUSTRIAL APPLICABILITY

A conveyer of a honeycomb formed article and a conveying method thereof according to the present invention: enable, without causing rejection at all, conveying a lengthy honeycomb formed article just after extruded that contains moisture abundantly, is soft and weak, and has heretofore been hardly formable; are excellent in cost and equipment size and are revolutionary; and have great industrial applicability.

DESCRIPTION OF THE REFERENCE SYMBOLS

1: conveyer of honeycomb formed article, 2: extruder, 3, 3b: cradle, 3a: lengthy cradle, 4: air float, 4a: conventional air float, 4b: low-profile air float, 5: honeycomb formed article, 6: elevator, 7: air float thickness, 10: conventional cradle conveyer, 14: supporting face, 24: air ejection pores.

What is claimed is:

1. A conveyer of a honeycomb formed article for guiding a lengthy honeycomb formed article extruded continuously from an extruder to cutting and drying steps, said conveyer comprising:
    a plurality of lengthy cradles that are sequentially supplied, at a downstream position of said extruder in an extruding direction, in synchronization with the extruding speed of said honeycomb formed article, and sequentially support and convey downstream said extruded honeycomb formed article on a mounting face formed so as to conform to a cross-sectional shape of a section perpendicular to an axial direction of said honeycomb formed article, and
    a fixed support that is fixed so as to extend from below the exit of said extruder to a supply position of said lengthy cradles, supports said honeycomb formed article just after being extruded, and conveys said honeycomb formed article to one of said lengthy cradles; wherein
    said fixed support is an air float having a supporting face formed so as to conform to said cross-sectional shape of said section perpendicular to the axial direction of said honeycomb formed article to be supported and a plurality of air ejection pores formed on said supporting face, that slides and conveys said honeycomb formed article from said extruder to one of said lengthy cradles by feeding air from said air ejection pores to between said supporting face and said honeycomb formed article.

2. The conveyer of a honeycomb formed article according to claim 1, wherein said air float is disposed to be downwardly-inclined from below said exit of said extruder toward the supply position of said lengthy cradles.

3. The conveyer of a honeycomb formed article according to claim 1, wherein the drop distance when said honeycomb formed article is transferred from said air float to one of said lengthy cradles is in the range of 5 to 70 mm.

4. The conveyer of a honeycomb formed article according to claim 1, wherein the thickness of the bottom of said air float is in the range of 5 to 40 mm.

5. The conveyer of a honeycomb formed article according to claim 1, having a humidity controller to control the relative humidity of said air ejected from said plurality of air ejection pores in the range of 30 to 80%.

6. The conveyer of a honeycomb formed article according to claim 1, wherein the length of said air float is in the range of 400 to 1,000 mm.

7. The conveyer of a honeycomb formed article according to claim 1, having a temperature controller to control the temperature of said air ejected from said plurality of air ejection pores to a temperature lower than that of said honeycomb formed article.

8. A conveying method of a honeycomb formed article for guiding a lengthy honeycomb formed article extruded continuously from an extruder to cutting and drying steps, said method comprising:
    an air float conveying step of supporting said honeycomb formed article just after being extruded with an air float as a fixed support having a plurality of air ejection pores formed on a supporting face, sliding and conveying said honeycomb formed article by air flowing from said air ejection pores to between said supporting face and said honeycomb formed article; and
    a lengthy cradle conveying step of transferring said honeycomb formed article from said air float to a lengthy cradle supplied adjacently to an end of said air float in the conveying direction and conveying said honeycomb formed article integrally with said lengthy cradle in the state where said honeycomb formed article is supported on a mounting face of said lengthy cradle.

9. The conveying method of a honeycomb formed article according to claim 8, wherein, in said air float conveying step, said honeycomb formed article is slid and conveyed by the functions of said air and its own weight with said air float disposed to be downwardly-inclined from below said exit of said extruder toward the supply position of said lengthy cradle.

10. The conveying method of a honeycomb formed article according to claim 8, wherein, in said air float conveying step, the relative humidity of said air ejected from said air ejection pores is controlled in the range of 30 to 80% and the temperature of said air is controlled to a temperature lower than that of said honeycomb formed article.

11. The conveyor of honeycomb formed article according to claim 5, wherein the humidity controller comprises atomizing nozzles.

* * * * *